(12) United States Patent
Bjontegaard et al.

(10) Patent No.: US 9,332,278 B2
(45) Date of Patent: May 3, 2016

(54) VIDEO COMPRESSION USING AN ADAPTIVE LOOP FILTER

(75) Inventors: Gisle Bjontegaard, Oppegard (NO); Arild Fuldseth, Snaroya (NO)

(73) Assignee: Cisco Technology, Inc., San Jose, CA (US)

( * ) Notice: Subject to any disclaimer, the term of this patent is extended or adjusted under 35 U.S.C. 154(b) by 627 days.

(21) Appl. No.: 13/538,171

(22) Filed: Jun. 29, 2012

(65) Prior Publication Data

US 2013/0003871 A1 Jan. 3, 2013

Related U.S. Application Data

(60) Provisional application No. 61/502,966, filed on Jun. 30, 2011.

(30) Foreign Application Priority Data

Jun. 29, 2011 (NO) .................................... 20110939

(51) Int. Cl.
| | |
|---|---|
| *H04N 7/26* | (2006.01) |
| *H04N 19/82* | (2014.01) |
| *H04N 19/176* | (2014.01) |
| *H04N 19/147* | (2014.01) |
| *H04N 19/61* | (2014.01) |
| *H04N 19/117* | (2014.01) |
| *H04N 19/136* | (2014.01) |
| *H04N 19/18* | (2014.01) |

(52) U.S. Cl.
CPC .............. *H04N 19/82* (2014.11); *H04N 19/117* (2014.11); *H04N 19/136* (2014.11); *H04N 19/147* (2014.11); *H04N 19/176* (2014.11); *H04N 19/18* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 2010/0158103 A1 | 6/2010 | Ye et al. | |
| 2010/0177822 A1 | 7/2010 | Karczewicz et al. | |
| 2010/0329362 A1* | 12/2010 | Choi | ............... H04N 19/139 375/240.29 |
| 2012/0039383 A1* | 2/2012 | Huang | ............... H04N 19/176 375/240.02 |
| 2012/0219174 A1* | 8/2012 | Wu | ............... G06K 9/00711 382/103 |
| 2012/0321205 A1* | 12/2012 | Lai | ............... G06K 9/36 382/233 |

OTHER PUBLICATIONS

Woo-Jin Han, et al., "Improved Video Compression Efficiency Through Flexible Unit Representation and Corresponding Extension of Coding Tools", IEEE Transactions on Circuits and Systems for Video Technology, vol. 20, No. 12, Dec. 2010.
International Search Report issued Aug. 9, 2012 in Application No. PCT/US2012/044942.

(Continued)

*Primary Examiner* — Christopher S Kelley
*Assistant Examiner* — Kaitlin A Retallick (57) ABSTRACT

A method including: obtaining video information at a video decoder apparatus, the video information including largest coding units of video data and filtering information, each of the largest coding units having a common size; obtaining, at the video decoder apparatus, an adaptive loop filter on/off indicator for each of the largest coding units, wherein each of the largest coding units includes a respective adaptive loop filter on/off indicator; and performing, by the video decoder apparatus, adaptive loop filtering to the largest coding units if the respective adaptive on/off indicators are on.

23 Claims, 5 Drawing Sheets (56) References Cited

OTHER PUBLICATIONS

Takeshi Chujoh, et al., "Improvement of Block-based Adaptive Loop Filter", 36. VCEG Meeting, Oct. 8, 2008-Oct. 10, 2008, Video Codingexperts Group of ITU-T SG. 16, No. VCEG-AJ13, XP030003635, Oct. 10, 2008, 19 pages.

Ken McCann, et al., "Video coding technology proposal by Samsung (and BBC)", 1. JCT-VC Meeting; Apr. 15, 2010-Apr. 23, 2010, (Jointcollaborative Team on Video Coding of ISO/IEC JTC1/SC29/WG11 and ITU-TSG. 16), XP030007574, Apr. 16, 2010, 36 pages.

Faouzi Kossentini, et al., "Adaptive Loop Filtering Using Two Filter Shapes", Joint Collaborative Team on Video Coding (JCT-VC) of ITU-T SG16 WP3 and ISO/IEC JTC1/SC29/WG11, No. JCTVC-E342, XP030008848, Mar. 11, 2011, 7 pages.

Faouzi Kossentini, et al., "Adaptive Loop Filtering Using Multiple Filter Shapes", Joint Collaborative Team on Video Coding (JCT-VC) of ITU-T SG16 WP3 and ISO/IEC JTC1/SC29/WG11, No. JCTVC-D385, XP030008424, Jan. 16, 2011, 8 pages.

\* cited by examiner

VIDEO COMPRESSION USING AN ADAPTIVE LOOP FILTER

CROSS-REFERENCE TO RELATED APPLICATIONS

The present application claims the benefit of U.S. Provisional Application 61/502,966, filed Jun. 30, 2012. The present application also claims priority to Norwegian patent application NO 20110939, filed Jun. 29, 2011. U.S. Provisional Application 61/502,966 and Norwegian patent application NO 20110939 are hereby incorporated by reference in their entirety.

TECHNICAL FIELD

The exemplary embodiments described herein relate to the field of digital video compression, including encoding and decoding of digital video signals.

BACKGROUND

Many video compression standards have been developed over the last 20 years. Many of those methods are standardized through ISO (the International Standards organization) or ITU (the International Telecommunications Union). Besides, a number of other proprietary methods have been developed. The main standardization methods are:
ITU: H.261, H.262, H.263, H.264; and
ISO: MPEG1, MPEG2, MPEG4/AVC).

DETAILED DESCRIPTION

Overview

An exemplary embodiment described herein is a method that includes: obtaining video information at a video decoder apparatus, the video information including largest coding units of video data and filtering information, each of the largest coding units having a common size; obtaining, at the video decoder apparatus, an adaptive loop filter on/off indicator for each of the largest coding units, wherein each of the largest coding units includes a respective adaptive loop filter on/off indicator; and performing, by the video decoder apparatus, adaptive loop filtering to the largest coding units if the respective adaptive on/off indicators are on.

Exemplary Embodiments

A video encoder may be implemented by dividing each frame of original video data in blocks of pixels. These blocks may be of size 16×16 and may be referred to as macroblocks (MB). The blocks may be larger (e.g. 64×64) and may be rectangular, for instance at frame boundaries.

The blocks may be processed and/or transmitted in raster scan order, i.e. from the top row of blocks to the bottom row of blocks, and from left to right within each row of blocks.

For each block of original pixel data, the encoding may be performed in the following steps:
Produce prediction pixels using reconstructed pixel values from i) the previous frame (inter prediction), or ii) previously reconstructed pixels in the current frame (intra prediction). Depending on the prediction type, the block is classified as an inter block or an intra block.
Compute the difference (block of residual pixel data) between each original pixel and the corresponding prediction pixel within the block.
Apply a two-dimensional transform to the difference samples resulting in a set of transform coefficients.
Quantize each transform coefficient to an integer number. This is a tool for controlling the bit production and reconstructed picture quality.
Establish a scanning of the two dimensional transform coefficient data into a one dimensional set of data.
Subject the data to lossless entropy encoding.

Figure 1:
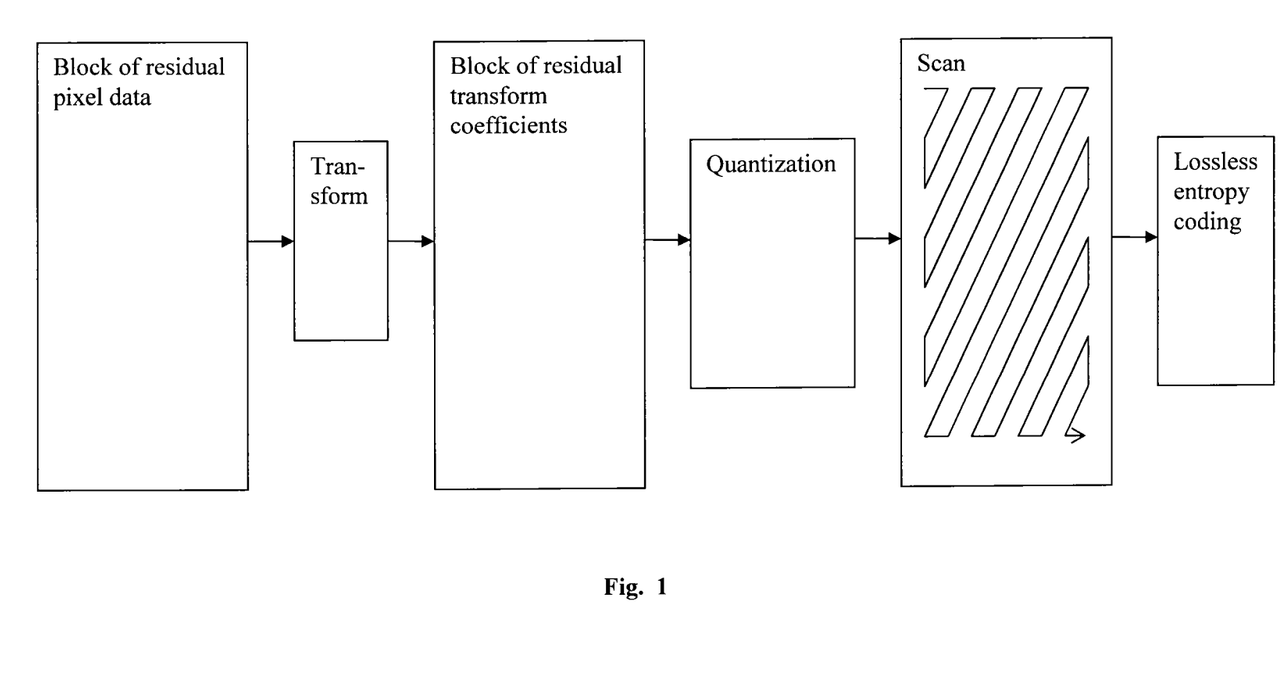
FIG. 1 illustrates the different steps in an example of an encoding process

The above steps, which are generally illustrated in FIG. 1, are listed in a natural order for the encoder. The decoder will, to some extent, perform the operations in the opposite order and do "inverse" operations as inverse transform instead of transform and de-quantization instead of quantization.

At the encoder, as well as at the decoder, the pictures will be reconstructed. Due to the quantization step, the reconstructed pictures will differ from the non-compressed input pictures. However, the reconstructed pictures may be identical at the encoder and decoder side.

Figure 2:
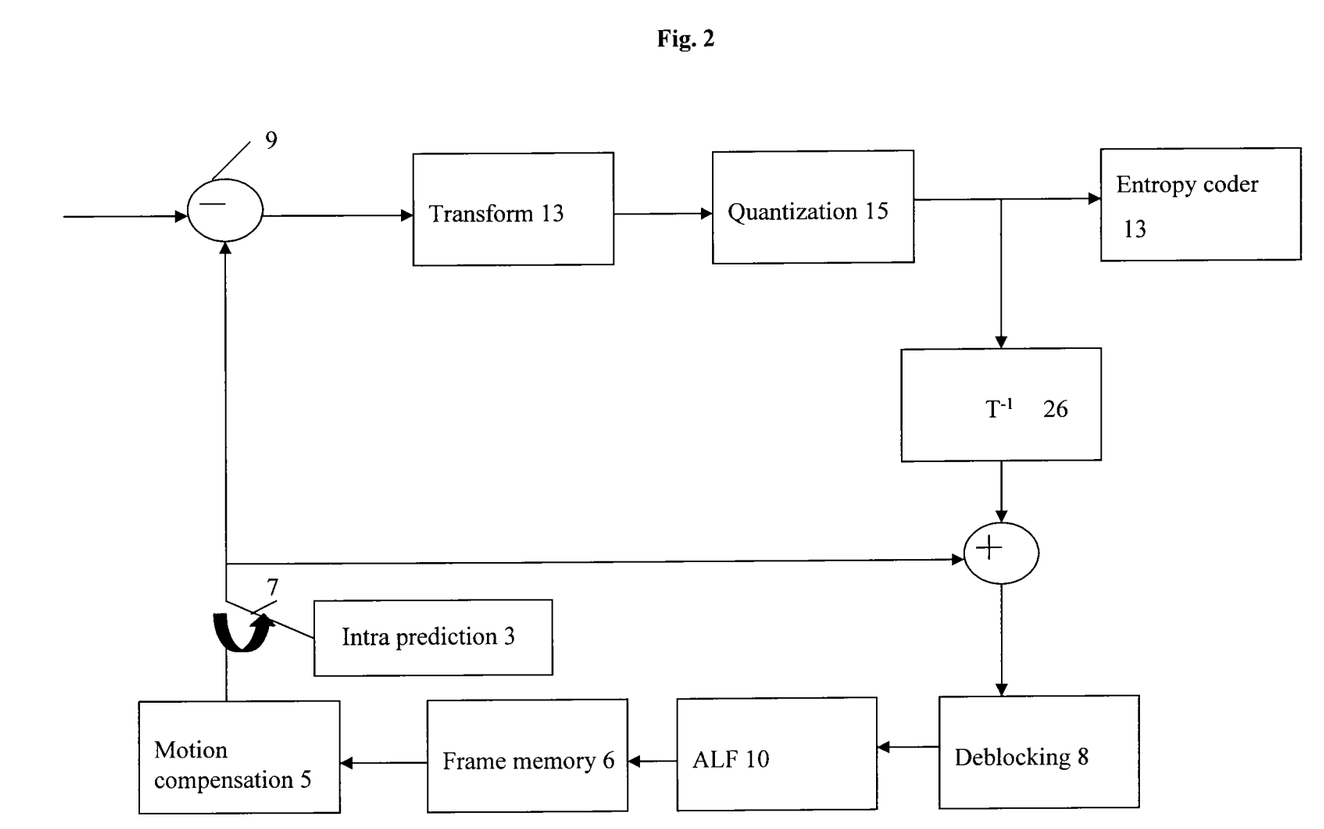
FIG. 2 is a block diagram of an example of a video encoder.
Figure 3:
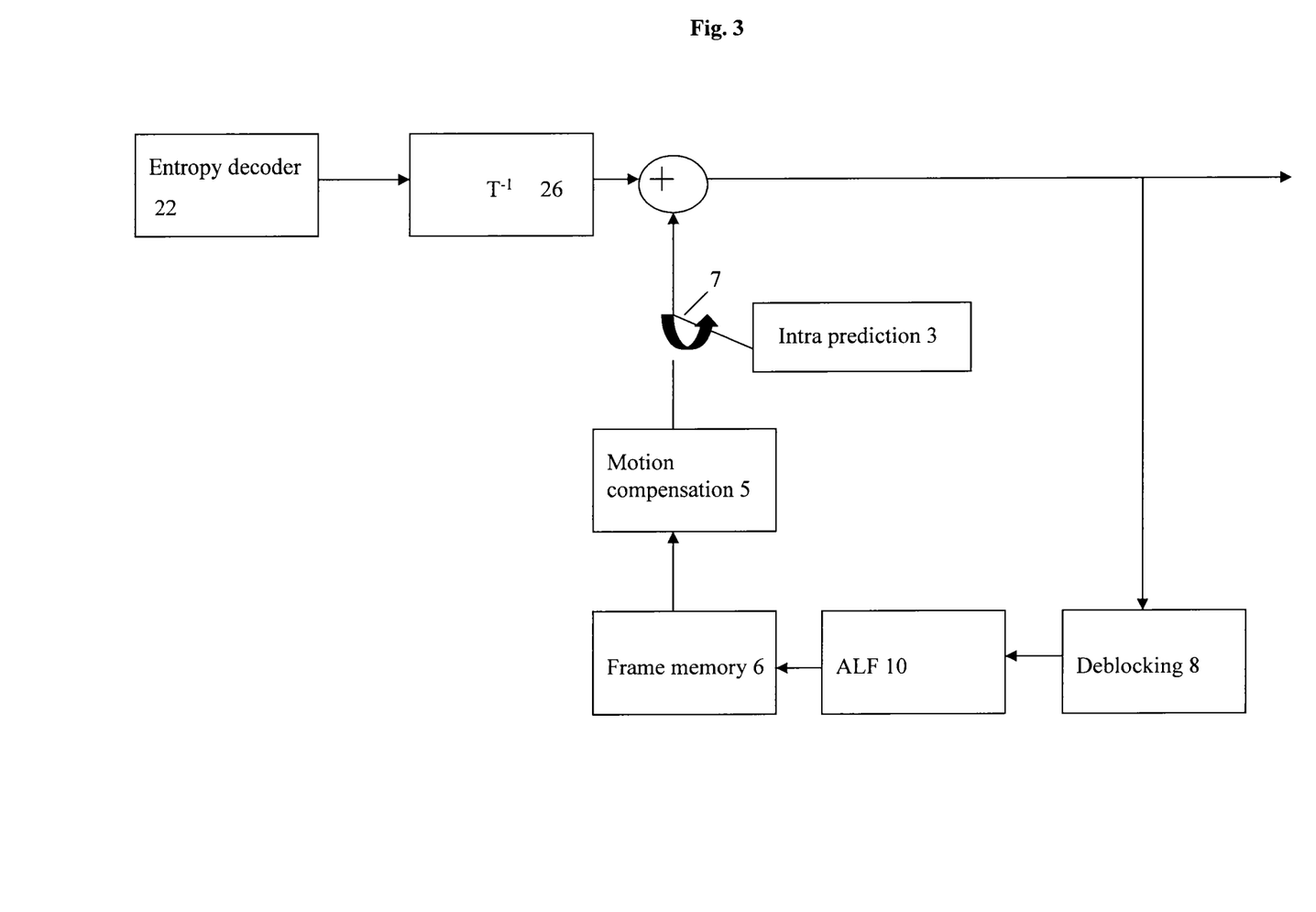
FIG. 3 is a block diagram of an example of a video decoder.

An exemplary implementation of an encoding and decoding process for video compression is discussed in further detail in reference to FIGS. 2 and 3. In FIG. 2, a current frame as well as a prediction frame are input to a subtractor 9. The subtractor 9 is provided with input from an intra prediction processing path 3 and a motion compensation processing path 5, the selection of which is controlled by switch 7. Intra prediction processing is selected for finding similarities within the current image frame, and is thus referred to as "intra" prediction. Motion compensation has a temporal component and thus involves anslysis between successive frames that is referred to as "inter" prediction.

The output of the switch 7 is subtracted from the pixels of the current frame in a subtractor 9, prior to being subjected to a two dimensional transform process 13. The transformed coefficients are then subjected to quantization in a quantizer 15 and then subject to an entropy encoder 17. Entropy encoding removes redundancies without losing information, and is referred to as a lossless encoding process. Subsequently, the encoded data is arranged in network packets via a packetizer, prior to being transmitted in a bit stream.

However, the output of the quantizer 15 is also applied to an inverse transformer 26, the output of which is used for assisting in prediction processing. The output is applied to a deblocking filter 8, which suppresses some of the sharpness in the edges to improve clarity and better support prediction processing. The output of the deblocking filter 8 is applied to a frame memory 6, which holds the processed image pixel data in memory for use in subsequent motion processing.

The corresponding decoding process for each block can be described as follows (as indicated in FIG. 3). After entropy decoding 22 (to produce the quantized transform coefficients) and two dimensional inverse transformation 26 on the quantized transform coefficient to provide a quantized version of the difference samples, the resultant image is reconstructed after adding the inter prediction and intra prediction data previously discussed.

Some of the more detailed encoder and decoder processing steps will now be described in more detail. In video encoders, blocks may be divided into sub-blocks. Typically, the blocks are of fixed (square) size, while the sub-blocks can be of various e.g. (rectangular) shapes. Also, the partitioning into sub-blocks will typically vary from one block to another.

Inter prediction is typically achieved by deriving a set of motion vectors for each sub-block. The motion vectors define the spatial displacement between the original pixel data and the corresponding reconstructed pixel data in the previous frame. Thus, the amount of data that needs to be transmitted to a decoder can be greatly reduced if a feature in a first frame can be identified to have moved to another location in a subsequent frame. In this situation, a motion vector may by used to efficiently convey the information about the feature that has changed position from one frame to the next. Intra prediction is typically achieved by deriving an intra direction mode for each sub-block. The intra direction mode defines the spatial displacement between the original pixel data and the previously reconstructed pixel data in the current frame.

Both motion vectors and intra direction modes are encoded and transmitted to the decoder as side information for each sub-block. In order to reduce the number of bits used for this side information, encoding of these parameters depends on the corresponding parameters of previously processed sub-blocks. Some form of adaptive entropy coding may be used. The adaptation makes the entropy encoding/decoding for a sub-block dependent on previously processed sub-blocks. Entropy encoding is lossless encoding that reduces the number of bits that are needed to convey the information to a receiving site.

An Adaptive Loop Filter (ALF) 10 may be performed in addition to a coding/decoding procedure indicated above and illustrated in FIGS. 2 and 3. The "L" stands for Loop which means that the filter operation takes place within the coding/prediction loop, as opposed to many other commonly known filter operations which is performed outside the loop, either as a pre-coding or as a post decoding step, e.g. to minimize subjective coding noise. Therefore, the filtering process needs to be identical on the encoder and decoder side to ensure the same basis for subsequent predictions.

An in-loop filtering process may reduce the coding noise by filtering the reconstructed pixels with filter taps created to minimize the difference from the original pixels. The filter taps are adaptive and are may be coded, transmitted and decoded together with the residuals, or an indication of which of a number of predefined filter tap sets currently being used are transmitted in the coded data stream.

Figure 4:
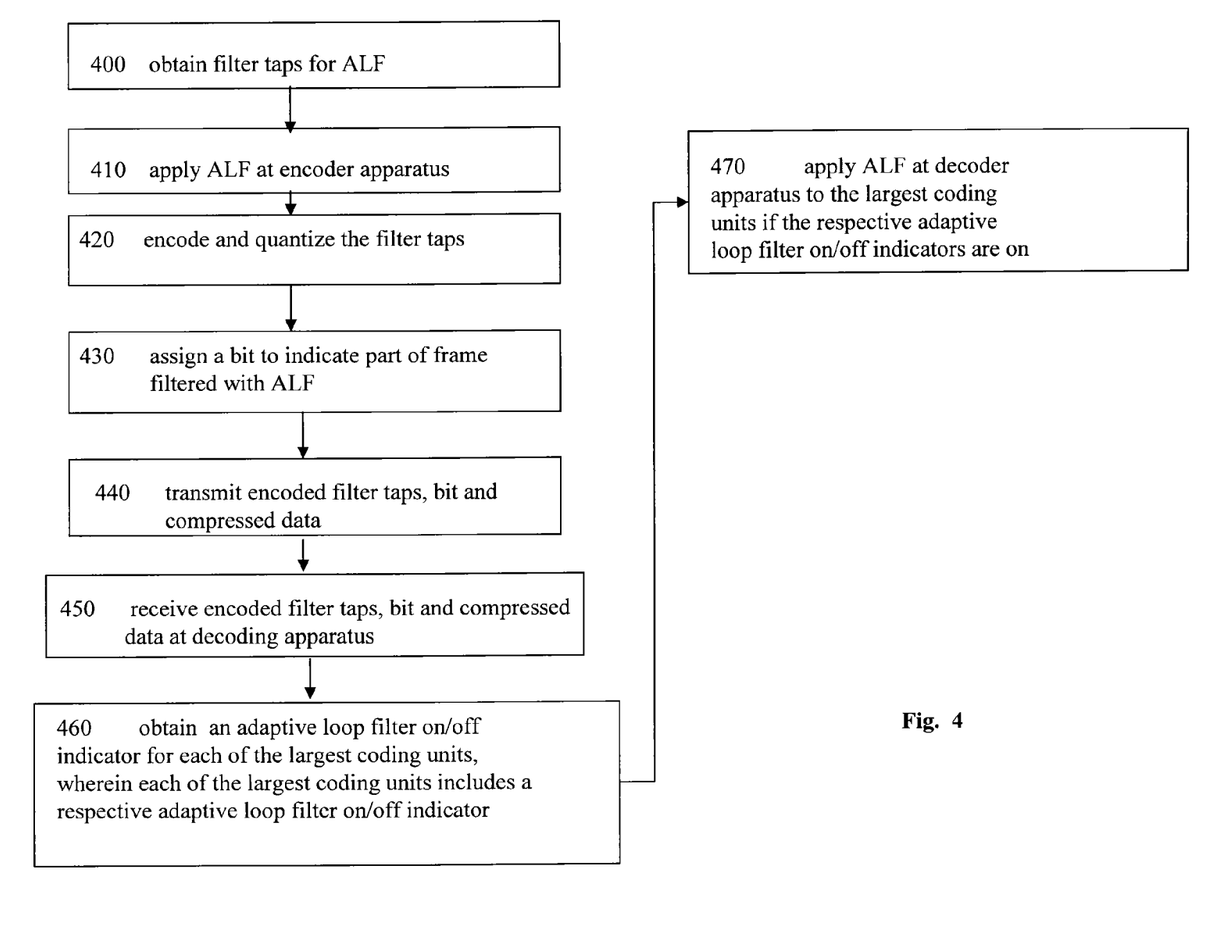
FIG. 4 is a flow chart for an exemplary embodiment for an adaptive loop filter.

FIG. 4 illustrates an exemplary method of applying ALF. In step 400, the filter taps for the ALF are obtained. In step 410, the ALF is applied at the encoder apparatus of FIG. 2. In step 420, the encoder apparatus encodes and quantizes the filter taps. In step 430, the encoder apparatus assigns a bit to indicate which part of the frame is filtered with ALF. The bit is an example of filtering information used in the application of the ALF. In step 440, the encoder apparatus transmits the encoded filter taps to a decoder apparatus, the encoder apparatus transmits the bit to the decoder apparatus, and the encoder apparatus transmits compressed video data to the decoder apparatus. In step 450, the decoder apparatus receives and decodes the filter tap, receives the bit, and receives the compressed video data. In step 460, the decoder apparatus obtains an adaptive loop filter on/off indicator for each of the largest coding units, wherein each of the largest coding units includes a respective adaptive loop filter on/off indicator. In step 470, the decoder apparatus applies the ALF during the process of decoding the compressed video data to the largest coding units if the respective adaptive loop filter on/off indicators are on. These steps are discussed in further detail below.

There are several possible filter tap patterns or pixel masks forming a filter tap set. A typical one is the 7×7 diamond shaped mask shown below.

The positions of the letters a to m indicate pixel positions. a is the centre position and is the position to be filtered. The letters a to m indicate the values of the filter taps used during the filtering. If the pattern above is rotated 180 degrees, the letters are still in the same position. This property is called rotational symmetry.

On a picture basis, the filter taps a to m may be calculated and adapted to minimize the square difference between the original picture and the reconstructed picture after the ALF operation. The calculation, which is performed on the encoder side, may include the following steps:

Establish an expression for the square difference between the original picture and reconstructed picture;

Minimize this difference by requiring that the partial derivative with respect to each filter tap is equal to 0. This results in 13 linear equations—one for each coefficient a to m; and Solve these sets of 13 equations using some standard equation solver.

When the filter taps are calculated, they are then quantized in a similar way as the transform coefficients in standard video coding. In an example of ALF, it consists basically in dividing the coefficients with a step_size of $2^{-n}$. The resulting quantized coefficients a' to j' may then be represented by integer numbers. The quantized filter taps are then coded losslessly, e.g. by entropy coding, and transmitted to the decoder.

With the described procedure, both encoder and decoder will have available several sets of filter taps to perform on individual pixel positions within each frame. However, coded filter tap sets may be transmitted for picture segments smaller than the whole picture. One such segment may be a Largest Coding Unit (LCU), and may consist of 64×64 pixels. A picture is divided into slices, with each slice composed of a sequence of LCUs. The optimum LCU size is dependent on the application. The LCU can be divided into four coding units (CUs). Each split CU can be divided into four CUs recursively up to the maximum allowed hierarchical depth, also specified in the sequence header. The LCU grid is static, and its size is fixed for all frames in a sequence. The encoder may perform filtering with several of the available sets of filter taps dedicated for this LCU and find out which set result in the best reconstruction. The number of this best set is signalled to the decoder to enable the decoder to do the same filtering as the encoder.

In addition, the pixels in the frame to be filtered may be classified according to the variation of pixel values around a pixel. This variation may be calculated in the following way. Assume that the pixel under consideration in the figure below is c.

```
        a
    b   c   d
        e
```

Let $|2c-b-d|+|2c-a-e|$ indicate the pixel variation around pixel c. Then calculate:
Variance=sum_over_a_small_pixel_area($|2c_i-b_i-d_i|+|2c_i-a_i-e_i|$) where $a_i$ to $e_i$ represent pixel values in a small area. Variance is used to classify a pixel or a small area of pixels into different pixel classes. The above calculation of filter coefficients are performed for each class of pixels. The filter operation can typically be like this:

Filtered_pixel_position_$a=((\Sigma_{i=0}^{24} coeff'_i * pixel_i) + 2^{n-1}) >> n$ $coeff'_i$ are the quantized coefficients a' to m' according to the pixel mask above.

Pixel$_i$ are the pixel values.

>>n is a right shift or division where n depend on the quantization step_size.

Objective gain may be defined as the reduction in bitrate when still producing the same Peak Signal to Noise Ratio (PSNR). The objective gain for the ALF may be 5%.

Similarly, subjective gain may be defined as the reduction in bitrate when still producing a video quality that is judged by human inspection to be the same. The subjective gain with ALF may be larger than the objective gain. On the negative side, the above-described version of ALF is very computational intensive. For some applications, this may imply that ALF cannot be used. Another drawback with the above-described version of ALF is related to coding delay. Operations are may be performed on whole video frames. This will introduce an extra coding delay of one video frame or more. This is a disadvantage for use of the coding method in conversational services where low encoding/decoding delay is one of the main requirements.

The following exemplary embodiment describes another ALF method that the provides the same or better objective and subjective coding gains compared with the above-described method, but at the same time is less computational intensive. Another important feature is low encoding/decoding delay. This other exemplary method is particularly useful in applications with tight limits to computational resources and/or applications with strict requirements on encoding/decoding delay. In the following embodiment, filter taps may be referred to as ALF coefficients.

The pixel mask shown in the description above can be called a dense pixel mask since all pixels in an area are included. According to one exemplary embodiment, the illustrated pixel mask below may be used.

```
    x       x       x
    x       x       x
        x   x   x
```

```
            x   x   x
x   x   x   x   x   x   x   x   x
            x   x   x
        x       x       x
    x           x           x
x               x               x
```

The pixels in the pixel mask lie on only these 4 lines that are denoted as horizontal, vertical, diagonal_45 (45 degrees from the horizontal) and dioganal_135 (45 degrees from the vertical). The pixel mask may be smaller or bigger than the one shown. Each line is a subset of filter taps that includes nine filter taps. In total, there are 33 filter taps for this pixel mask. Respective midpoint positions of the four lines all coincide with the pixel position of the pixel to be filtered. Every pair of two filter taps equally distanced on each side of the pixel position of the pixel may be equal. Alternatively, only some of the pairs of filter taps may be equal.

In an alternative exemplary embodiments, a pixel mask suitable for low complexity could be as follows:

```
        x   x   x                           (A)
            x   x   x
    x   x   x   x   x   x   x
            x   x   x
        x   x   x
```

OR

```
        x   x   x                           (B)
            x   x   x
    x   x   x   x   x
            x   x   x
        x   x   x
```

In (A), the horizontal line includes 7 filter taps. In (B), each line is a subset of filter taps that includes five filter taps. In (A), there are 19 filter taps for the pixel mask. In (B), there are 17 filter taps for the pixel mask.

A classification of pixels into different classes may also be used. An area of pixels n*m is assigned a class number, where n and m are integers greater than 0. The classification may typically be made according to variation of pixel values within the n*m pixel area or according to orientation (e.g. horizontal or vertical) or structure of the pixel content within the n*m pixel area. One class only may be used (in practice no classification), or typically a small number of classes (say up to 16). Typically n=4 and m=4, but other values of n and m may be used. The following calculations of ALF coefficients are then made for each pixel class.

In the following examples, the two last illustrated pixel masks above will be used. However, other masks may be used. The pixel masks illustrated above, disclose the pattern of the masks. There is symmetry of the filter taps around the pixel position to be calculated. Assume further the following pixel mask.

```
        j       f       h
            i   e   g
```

-continued $$\begin{array}{cccccc} d & c & b & a & b & c & d \\ & & g & e & i & & \\ & & h & f & j & & \end{array}$$

With this type of pixel mask and rotational symmetry, it is possible to do explicit filtering in one of the 4 directions.

Horizontal filtering if no other coefficients than a,b,c,d≠0
Vertical filtering if no other coefficients than a,e,f≠0
Diagonal_45 filtering if no other coefficients than a,g,h≠0
Diagonal_135 filtering if no other coefficients than a,i,j≠0

As an example, the calculations to obtain the optimal ALF coefficients will be shown for the smaller pixel matrix above. In the pixel mask below, n0 denotes the position of the pixel to be filtered. n0 to n18 denote the pixel positions to be used to calculate the filtered version at position n0. $p_i$ is the pixel value at position i.

$$\begin{array}{ccccccc} & & n9 & & n5 & & n7 \\ & & & n8 & n4 & n6 & \\ n12 & n11 & n10 & n0 & n1 & n2 & n3 \\ & & & n15 & n13 & n17 & \\ & & n16 & & n14 & & n18 \end{array}$$

The square difference between $p_{n0}$ and the filtered version at position $p_{n0}$ is:

$$(p_{n0}-(a*\mathbf{p_{n0}}+b*(p_{n1}+p_{n10})+c*(p_{n2}+p_{n11})+d*(p_{n3}+p_{n12})+e*(p_{n4}+p_{n13})+f*(p_{n5}+p_{n14})+g*(p_{n6}+p_{n15})+h*(p_{n7}+p_{n16})+i*(p_{n8}+p_{n17})+j*(p_{n9}+p_{n18}))^2$$

Note that the bold p-parameter in the expression above and in the following expressions is a non-coded pixel value, while the p-parameters not in bold are reconstructed pixel values.

To find the coefficients a to j, the square difference over a set of pixels shall be minimized. This set of pixels may be a full picture, a LCU or something different. Particularly, rectangular areas as indicated below may be used.

The large rectangle indicates a video frame. The two smaller rectangles indicate possible units for performing ALF. The main point is the limited vertical size of the units to reduce the encoding/decoding delay.

This set of pixels where coefficients are calculated and ALF is performed will be referred to as an ALF-unit.

The expression to be minimized may be written as:

$$\Sigma_n(p_{n0}-(a*\mathbf{p_{n0}}+b*(p_{n1}+p_{n10})+c*(p_{n2}+p_{n11})+d*(p_{n3}+p_{n12})+e*(p_{n4}+p_{n13})+f*(p_{n5}+p_{n14})+g*(p_{n6}+p_{n15})+h*(p_{n7}+p_{n16})+i*(p_{n8}+p_{n17})+j*(p_{n9}+p_{n18}))^2$$

The sum over n indicate sum of the set of pixels included in e.g. a LCU or a whole picture. The normal way of minimizing this expression is to require that each of the partial derivatives with respect to the coefficients a to j shall be 0. As an example the partial derivative with respect to a, is required to be 0 or:

$$\Sigma_n(p_{n0}-(a*\mathbf{p_{n0}}+b*(p_{n1}+p_{n10})+c*(p_{n2}+p_{n11})+d(p_{n3}+p_{n12})+e*(p_{n4}+p_{n13})+f*(p_{n5}+p_{n14})+g*(p_{n6}+p_{n15})+h*(p_{n7}+p_{n16})+i*(p_{n8}+p_{n17})+j*(p_{n9}+p_{n18})*\mathbf{p_{n0}}=0$$

Similar expressions can be obtained as the partial derivative with respect to the other coefficients b to j. This result in a set of 10 linear equations that can be solved to find the unknowns a to j.

One way of quantization is to multiply the coefficients with a number followed by a conversion to an integer number. It is convenient to multiply with a number $2^n$. n can typically depend on the quantisation parameter (qp) used in the initial coding using smaller n for larger qp. A typical value for n may be 6 so that $2^6=64$. Then quantized versions of b to j are derived:

b'=Nearest_integer(b*64)
c'=Nearest_integer(c*64)
d'=Nearest_integer(d*64)
e'=Nearest_integer(e*64)
f'=Nearest_integer(f*64)
g'=Nearest_integer(g*64)
h'=Nearest_integer(h*64)
i'=Nearest_integer(i*64)
j'=Nearest_integer(j*64)

Nearest_integer( ) is a function that delivers the nearest integer as an output. Example:

Nearest_integer(23.64)=24

Finally set:

$$a'=64-2*(b'+c'+d'+e'+f'+g'+h'+i'+j')$$

This results in a DC-response of the adaptive loop filter being equal to 1. If we had quantized a similarly to the other coefficients we would have needed a finer quantizer—requiring more bits for transmission—to ensure a proper DC-response.

The quantized ALF coefficients further undergo lossless coding and are transmitted to the decoder. Context-adaptive binary arithmetic coding (CABAC) or Context-adaptive variable-length coding (CAVLC) may be used.

Following the example above, a new value for pixel position n0 is calculated as:

$$p'_{n0}-(a*\mathbf{p_{n0}}+b*(p_{n1}+p_{n10})+c*(p_{n2}+p_{n11})+d*(p_{n3}+p_{n12})+e*(p_{n4}+p_{n13})+f*(p_{n5}+p_{n14})+g*(p_{n6}+p_{n15})+h*(p_{n7}+p_{n16})+i*(p_{n8}+p_{n17})+j*(p_{n9}+p_{n18})+32)>>6$$

wherein >>6 means right shift with 6 bits which is the same as division by 64.

The filtering may be performed on a different set of pixels from what was used to calculate the filter coefficients.

The calculation of coefficients and following filtering may be done on the same set of pixels. This may be a LCU consisting of 64×64 pixels or some other unit. This approach contributes to balance the relatively coarse quantization described above which result in a moderate use of bits to transmit a set of quantized coefficients.

With this approach there is little or no need to do multiple filtering with different sets of coefficients since the calculated coefficients are the optimal ones for the pixels to be filtered (e.g. a LCU).

By doing an in-loop filtering the effect of the filtering will still remain for the next pixels in the same spatial location. Especially, if there is no change from frame to frame the filtering effect will remain forever and there is no need to filter again. This is very useful to reduce the computational com plexity of ALF. The following methods for reducing the number of pixels to undergo ALF can be used:

Systematically filtering at most a fraction of the pixels. ¼ is an example of such a fraction and it seems that the coding effect is practically the same as if all pixels were filtered. This may be implemented by doing ALF on ¼ of the frames in the video. Other selection rules can be used as doing ALF on ¼ of each frame in a systematic way. It is assumed that the encoder and decoder can use the same rules to avoid sending bits in this connection.

Omit ALF if there has not been any significant change of the pixels to be filtered since last time it was considered for ALF. Both encoder and decoder can do the same decision without sending bits in this connection.

Omit filtering if b' to j'=0. In this case filtering will have no effect. 1 bit can be used to signal if all coefficients b' to j' are 0 or not.

The encoder can do a rate-distortion decision whether to use ALF. This implies computing a cost function based on the bit usage for ALF coefficients and distortion improvement.

Generally, one bit is used to signal to the decoder whether the ALF-unit shall be filtered or not. This one bit is an example of an ALF on/off indicator. In case the ALF-unit shall not be filtered (i.e., ALF off), no filter coefficients need to be coded.

Figure 5:
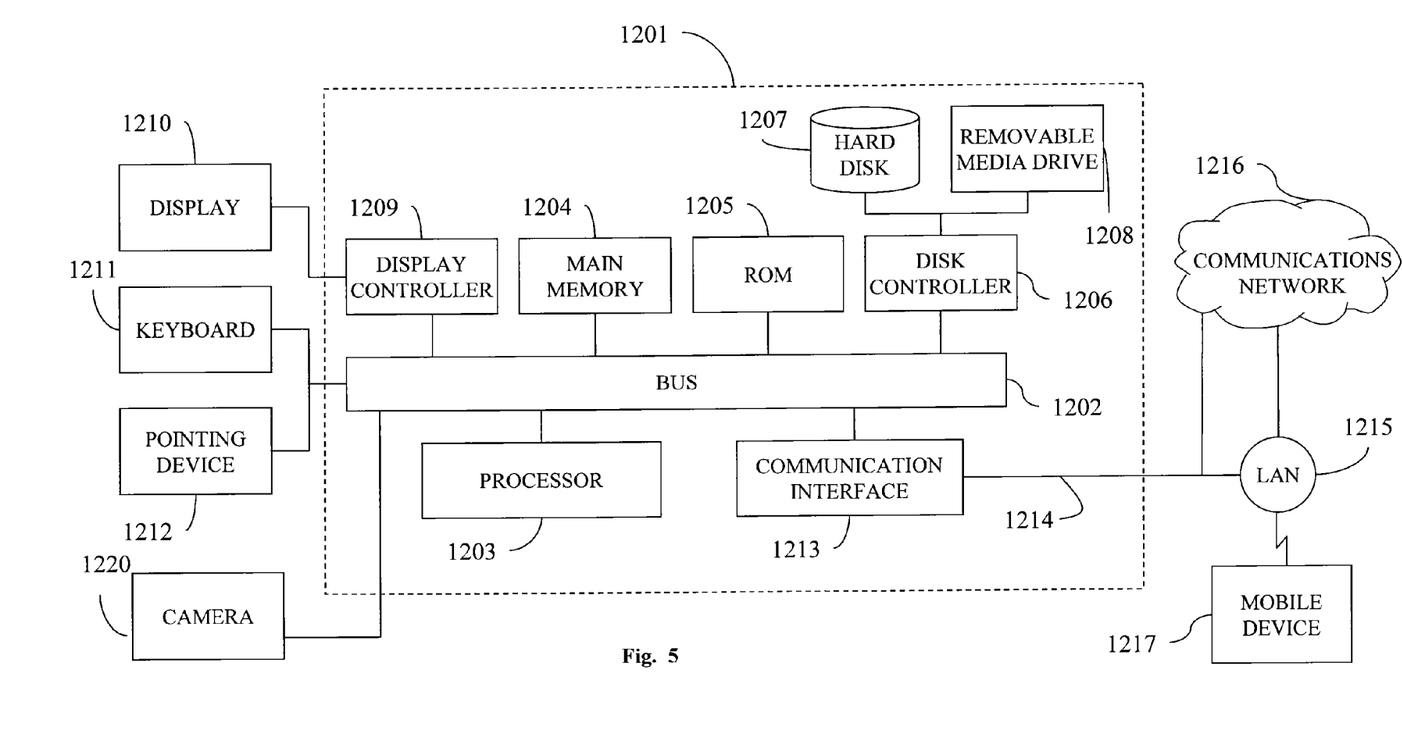
FIG. 5 illustrates an exemplary hardware computer system that may programmed as a video encoder apparatus or a video decoder apparatus.

FIG. 5 illustrates a computer system 1201 upon which an embodiment of the adpative loop filtering may be implemented. The computer system in FIG. 12 may be programmed as an encoder apparatus or a decoder apparatus and execute the algorithms described above. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the adaptive loop filtering embodiments described herein in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the exemplary adaptive loop filtering processes described herein and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, ane exemplary embodiment may include software for controlling the computer system 1201, for driving a device or devices for implementing the exemplary adaptive loop filtering embodiments, and for enabling the computer system 1201 to interact with a human user (e.g., print production personnel). Such software may include, but is not limited to, device drivers, operating systems, development tools, and applications software.

Computer code devices of the exemplary embodiments described herein may be any interpretable or executable code mechanism, including but not limited to scripts, interpretable programs, dynamic link libraries (DLLs), Java classes, and complete executable programs. Moreover, parts of the processing of the exemplary embodiments may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the exemplary embodiments remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 120

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method comprising:
obtaining video information at a video decoder apparatus, the video information including largest coding units of video data, each of the largest coding units having a common size;
obtaining, at the video decoder apparatus, an adaptive loop filter on/off indicator for each of the largest coding units having the common size, wherein each of the largest coding units includes a respective adaptive loop filter on/off indicator;
obtaining, in response to the on/off indicator being on, a plurality of quantized filter coefficients corresponding to a set of filter coefficients except for one filter coefficient, for a given largest coding unit, wherein the plurality of quantized filter coefficients are filter coefficients quantized by multiplication with a number $2^n$, where n depends on a quantization parameter, and a nearest integer function of a result of the multiplication;
deriving values for the set of filter coefficients, except for one filter coefficient, from the plurality of quantized coefficients;
deriving a value for the one filter coefficient based on a priori knowledge of a sum of all filter coefficients for the given largest coding unit; and
performing, by the video decoder apparatus, adaptive loop filtering to the given largest coding unit using values for all the filter coefficients in the set of filter coefficients.

2. The method of claim 1, wherein the largest coding units are 64×64.

3. The method of claim 1, wherein the largest coding units are rectangular.

4. The method of claim 1, wherein the performing includes applying the adaptive loop filtering in at least a part of a video frame, filter coefficients of the adaptive loop filtering being adaptive in terms of minimizing a square difference between the at least the part of the video frame and a corresponding reconstructed part of the video frame after adaptive loop filtering, the filter coefficients being associated with pixel positions in the video frame in a filter coefficient pattern that is symmetrical around a pixel position of a pixel to be filtered, wherein the filter coefficient pattern is formed only by four lines, along which respective subsets of the filter coefficients are uniformly distributed, including a horizontal line, a vertical line, a first diagonal line at an angle of 45 degrees with the horizontal line and a second diagonal line at an angle of 45 degrees with the vertical line,
respective midpoint positions of the four lines all coincide with the pixel position of the pixel to be filtered, and
two filter coefficients equally distanced on each side of the pixel position of the pixel to be filtered are equal.

5. The method according to claim 1, wherein the performing includes applying the adaptive loop filtering to less than all frames in the video information or to less than an entirety of each frame in the video information.

6. The method according to claim 5, wherein the applying includes applying the adaptive loop filtering to only every fourth frame in the video information or to only ¼ of pixels in each of the frames in the video information.

7. The method according to claim 4, wherein each of the subsets of filter coefficients includes nine filter coefficients.

8. The method according to claim 4, wherein each of the subsets of filter coefficients includes five filter coefficients.

9. The method according to claim 1, wherein the adaptive loop filter on/off indicator is one bit.

10. A non-transitory computer readable storage medium encoded with instructions, which when executed by an encoding or decoding apparatus causes the encoding or decoding apparatus to execute a method comprising:
  obtaining video information at a video decoder apparatus, the video information including largest coding units of video data, each of the largest coding units having a common size;
  obtaining, at the video decoder apparatus, an adaptive loop filter on/off indicator for each of the largest coding units, wherein each of the largest coding units includes a respective adaptive loop filter on/off indicator;
  obtaining, in response to the on/off indicator being on, a plurality of quantized filter coefficients corresponding to a set of filter coefficients except for one filter coefficient, for a given largest coding unit, wherein the plurality of quantized filter coefficients are filter coefficients quantized by multiplication with a number $2^n$, where n depends on a quantization parameter, and a nearest integer function of a result of the multiplication;
  deriving values for the set of filter coefficients, except for one filter coefficient, from the plurality of quantized coefficients;
  deriving a value for the one filter coefficient based on a priori knowledge of a sum of all filter coefficients for the given largest coding unit; and
  performing, by the video decoder apparatus, adaptive loop filtering to the given largest coding unit using values for all the filter coefficients in the set of filter coefficients.

11. The non-transitory computer readable medium of claim 10, wherein the largest coding units are 64×64.

12. The non-transitory computer readable medium of claim 10, wherein the largest coding units are rectangular.

13. The non-transitory computer readable medium of claim 10, wherein the instructions for the performing comprise instructions for applying the adaptive loop filtering in at least a part of a video frame, filter coefficients of the adaptive loop filtering being adaptive in terms of minimizing a square difference between the at least the part of the video frame and a corresponding reconstructed part of the video frame after adaptive loop filtering, the filter coefficients being associated with pixel positions in the video frame in a filter coefficient pattern that is symmetrical around a pixel position of a pixel to be filtered, wherein
  the filter coefficient pattern is formed only by four lines, along which respective subsets of the filter coefficients are uniformly distributed, including a horizontal line, a vertical line, a first diagonal line at an angle of 45 degrees with the horizontal line and a second diagonal line at an angle of 45 degrees with the vertical line,
  respective midpoint positions of the four lines all coincide with the pixel position of the pixel to be filtered, and
  two filter coefficients equally distanced on each side of the pixel position of the pixel to be filtered are equal.

14. The non-transitory computer readable medium of claim 10, wherein the instructions for applying include instructions for applying the adaptive loop filtering to less than all frames in a video or to less than an entirety of each frame in the video.

15. The non-transitory computer readable medium of claim 14, wherein the instructions for applying includes include instructions for applying the adaptive loop filtering to only every fourth frame in the video information or to only ¼ of pixels in each of the frames in the video information.

16. The non-transitory computer readable medium of claim 13, wherein each of the subsets of filter coefficients includes nine filter coefficients or five filter coefficients.

17. The non-transitory computer readable medium of claim 10, wherein the adaptive loop filter on/off indicator is one bit.

18. An apparatus comprising:
  a memory that stores computer executable instructions; and
  a processor that executes the instructions, in order to:
    receive video information, the video information including largest coding units of video data, each of the largest coding units having a common size,
    receive an adaptive loop filter on/off indicator for each of the largest coding units having the common size, wherein each of the largest coding units includes a respective adaptive loop filter on/off indicator,
    receive a plurality of quantized filter coefficients corresponding to a set of filter coefficients except for one filter coefficient, for a given largest coding unit, wherein the plurality of quantized filter coefficients coincide with the on/off indicator indicating that the respective adaptive loop filter being on, wherein the plurality of quantized filter coefficients are filter coefficients quantized by multiplication with a number $2^n$, where n depends on a quantization parameter, and a nearest integer function of a result of the multiplication; and
    derive values for the set of filter coefficients, except for one filter coefficient, from the plurality of quantized coefficients;
    derive a value for the one filter coefficient based on a priori knowledge of a sum of all filter coefficients for the given largest coding unit; and
    perform adaptive loop filtering to the given largest coding unit using values for all the filter coefficients in the set of filter coefficients.

19. The apparatus of claim 18, wherein the adaptive loop filter on/off indicator is one bit.

20. The apparatus of claim 18, wherein the largest coding units are rectangular.

21. The apparatus of claim 18, wherein the processor is configured to apply the adaptive loop filtering to less than all frames in the video information or to less than an entirety of each frame in the video information.

22. The apparatus of claim 21, wherein the processor is configured to apply the adaptive loop filtering to only every fourth frame in the video information or to only ¼ of pixels in each of the frames in the video information.

23. The apparatus of claim 18, wherein the processor is configured to apply the adaptive loop filtering in at least a part of a video frame, filter coefficients of the adaptive loop filtering being adaptive in terms of minimizing a square difference between the at least the part of the video frame and a corresponding reconstructed part of the video frame after adaptive loop filtering, the filter coefficients being associated with pixel positions in the video frame in a filter coefficient pattern that is symmetrical around a pixel position of a pixel to be filtered, wherein
  the filter coefficient pattern is formed only by four lines, along which respective subsets of the filter coefficients are uniformly distributed, including a horizontal line, a vertical line, a first diagonal line at an angle of 45 degrees with the horizontal line and a second diagonal line at an angle of 45 degrees with the vertical line,
  respective midpoint positions of the four lines all coincide with the pixel position of the pixel to be filtered, and two filter coefficients equally distanced on each side of the pixel position of the pixel to be filtered are equal.

* * * * *